US006686843B2

(12) United States Patent
Felkowitz

(10) Patent No.: US 6,686,843 B2
(45) Date of Patent: Feb. 3, 2004

(54) METHOD AND APPARATUS FOR DETERMINING THE TEMPERATURE OF AN INFANT

(75) Inventor: Steven Felkowitz, Ft. Lauderdale, FL (US)

(73) Assignee: Atico International USA, Inc., Ft. Lauderdale, FL (US)

(*) Notice: Subject to any disclaimer, the term of this patent is extended or adjusted under 35 U.S.C. 154(b) by 95 days.

(21) Appl. No.: 09/911,076

(22) Filed: Jul. 23, 2001

(65) Prior Publication Data
US 2002/0017997 A1 Feb. 14, 2002

Related U.S. Application Data
(60) Provisional application No. 60/222,342, filed on Jul. 24, 2000.

(51) Int. Cl.$^7$ ............................................... G08B 23/00
(52) U.S. Cl. ..................... 340/573.1; 340/539.1; 340/539.11; 340/539.14; 340/539.15; 340/539.21; 340/584; 340/588
(58) Field of Search ............................. 340/573.1, 539, 340/573.4, 584, 588, 600, 691.1, 691.6, 693.5, 286.07, 825.19, 539.1, 539.11, 539.14, 539.15, 539.21

(56) References Cited

U.S. PATENT DOCUMENTS

| | | | | | |
|---|---|---|---|---|---|
| 5,559,497 A | * | 9/1996 | Hong | .................. | 340/573.1 |
| 5,873,892 A | * | 2/1999 | Cohen | .................. | 606/234 |
| 5,912,624 A | * | 6/1999 | Howard, II | ................ | 340/632 |
| 5,914,660 A | * | 6/1999 | Mesibov et al. | ......... | 340/573.1 |
| 5,938,619 A | * | 8/1999 | Dogre Cuevas | ............ | 600/549 |
| 6,218,946 B1 | * | 4/2001 | Chao Jung | ............... | 340/573.1 |
| 6,377,177 B1 | * | 4/2002 | Broussard et al. | ....... | 340/573.1 |

* cited by examiner

Primary Examiner—Daryl Pope
(74) Attorney, Agent, or Firm—Gibbons, Del Deo, Dolan, Griffinger & Vecchione

(57) ABSTRACT

A monitor of a body parameter of an infant, comprises at least one monitoring station having at least one sensor arranged to sense a body parameter of an infant, a controller responsive to the sensing of the body parameter of the infant by the at least one sensor to generate a signal that is either indicative of the sensed body parameter or indicative of a result from a comparison of the sensed body parameter with at least one value, and a transceiver arranged to transmit the signal in response to direction from the controller and at least one companion station having a further transceiver and having an output device and being spaced from the at least one monitoring station, the further transceiver being responsive to receipt of the signal to transmit the signal to the output device.

24 Claims, 16 Drawing Sheets

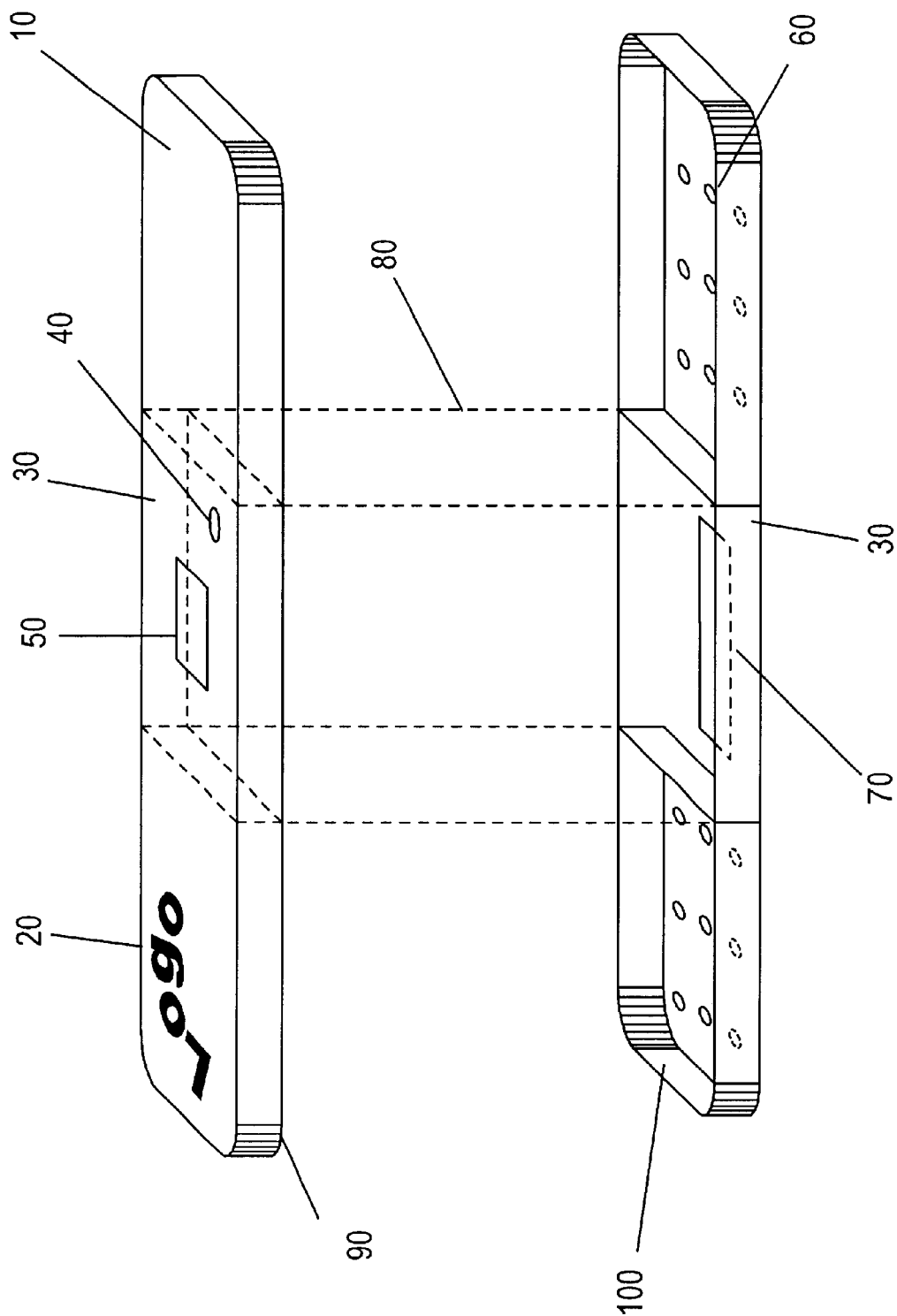

METHOD AND APPARATUS FOR DETERMINING THE TEMPERATURE OF AN INFANT

CROSS-REFERENCE TO COPENDING PATENT APPLICATIONS

This is a non-provisional utility patent application that claims priority from U.S. Provisional Patent Application No. 60/222,342 filed Jul. 24, 2000.

FIELD OF THE INVENTION

This invention relates to the field of temperature sensing apparatuses, specifically those specially adapted for use on an infant.

BACKGROUND OF THE INVENTION

The health of one's children has always been considered to be of the utmost importance. This is especially true of newborns and infants who, having built up few immunities to sickness and disease, are very vulnerable. Furthermore, serious disease or maladies early in life may lead to permanent physiological problems in the child's future. Therefore, many parents spend a great amount of time checking on their infants so that they may either prevent sickness from occurring or help eliminate it as soon as it does occur.

One very important key to an infant's health is maintaining an infant's body temperature within a certain tolerance level of the average human body temperature. A high body temperature beyond a certain tolerance level may be undesirable. The third leading cause of death among infants 1 month to 1 year in age is Sudden Infant Death Syndrome (SIDS), the unexpected death of an infant typically under 1 year old, without explicable cause. While SIDS has no symptoms and provides no indication, parents can follow some precautionary measures to help minimize the possibility that their child may afflicted. One precautionary measure now being advocated by doctors is preventing a sleeping infant's body temperature from rising too highly and/or too rapidly.

A high body temperature is undesirable for other reasons as well. For example, a high body temperature may cause a small infant discomfort, leading him to cry and scream. A high body temperature may also be the sign of an infectious disease which should be attended to by the parent. An extremely high body temperature at an early age may even cause permanent brain damage or death.

An abnormally low body temperature is equally undesirable. Because an infant contains less body fat than an adult, certain ambient temperatures that may be comfortable for an adult may be too cold for an infant. This would leave the infant uncomfortable which may lead to the infant crying and screaming. Furthermore, a low body temperature may also be indicative of a malady or sickness.

It would be desirable, then, to have a device that periodically monitors an infant's body temperature automatically so that a parent may take appropriate measures if the infant's body temperature is too high or too low.

SUMMARY OF THE INVENTION

The present invention is a system for continuously monitoring the body temperature of an infant in order to promote health and comfort.

According to one aspect of the invention, the monitoring system includes a temperature monitoring station having a housing, a temperature sensor and a Radio Frequency (RF) transceiver and a companion station having a housing, an RF transceiver and an output device.

BRIEF DESCRIPTION OF THE DRAWINGS

FIG. 2c illustrates the side view of the temperature monitoring station embodied as an adhesive patch;

FIG. 4b illustrates a bottom view of a bottom layer of the temperature monitoring station embodied as a strap of FIG. 4a;

DETAILED DESCRIPTION OF THE INVENTION

The present invention is a system for continuously monitoring the body temperature of an infant in order to promote health and comfort.

Figure 1:
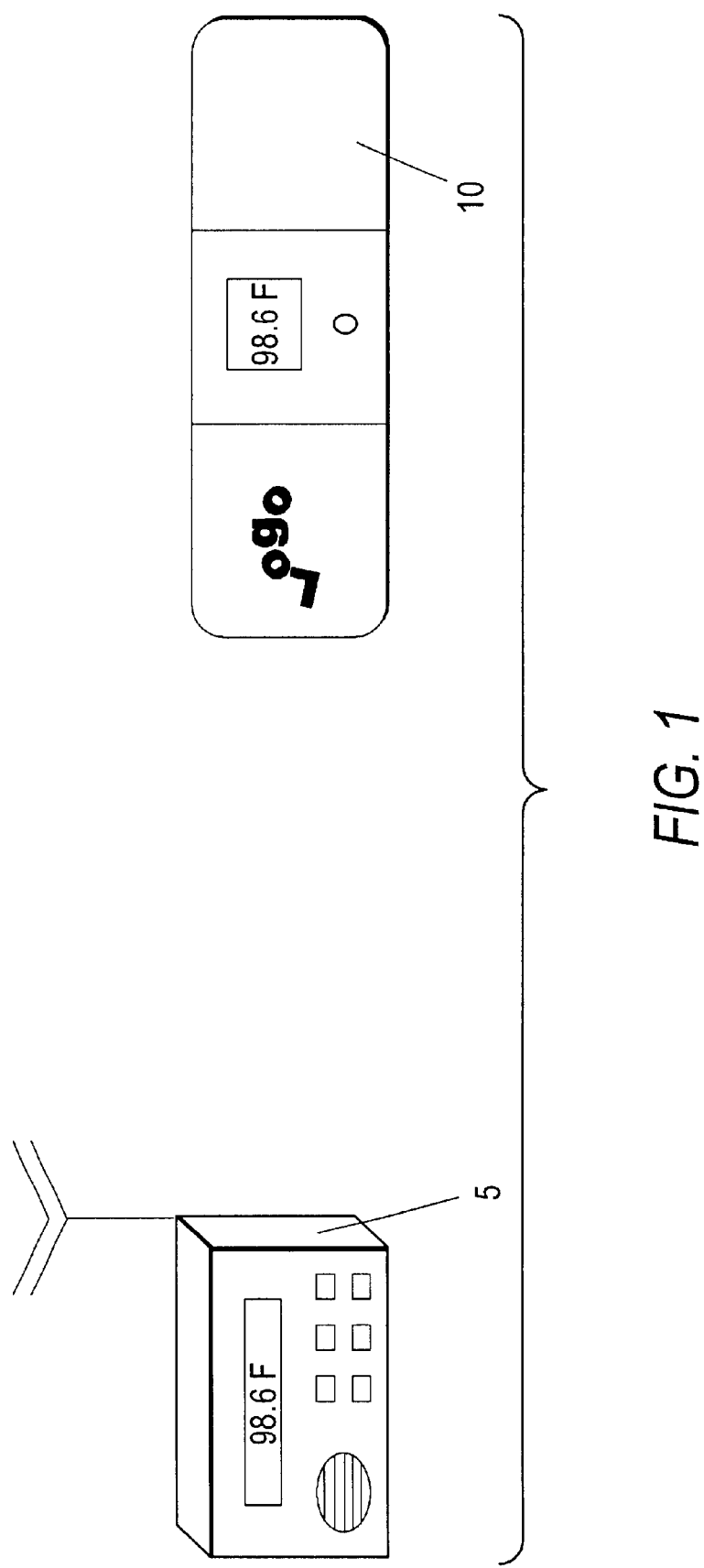
FIG. 1 illustrates a schematic representation of an embodiment of the temperature monitoring system.

FIG. 1 illustrates one embodiment of the present invention. The present invention may include a temperature monitoring station (TMS) 10 and a companion station (CS) 5. It may also include a single TMS 10 and more than one CS 5, or, conversely, it may include more than one TMS 10 and a single CS 5. Lastly, it may include more than one TMS 10 and more than one CS 5. The TMS 10 monitors the infant's current body temperature. It may transmit and receive information to and from the CS 5 through radio frequencies (RF). As such, a user may remotely control one of these devices by interacting with the other.

FIG. 2 illustrates the TMS 10 embodied as an adhesive patch. The adhesive patch may be composed of two layers pressed together to form a single unit.

Figure 2A:
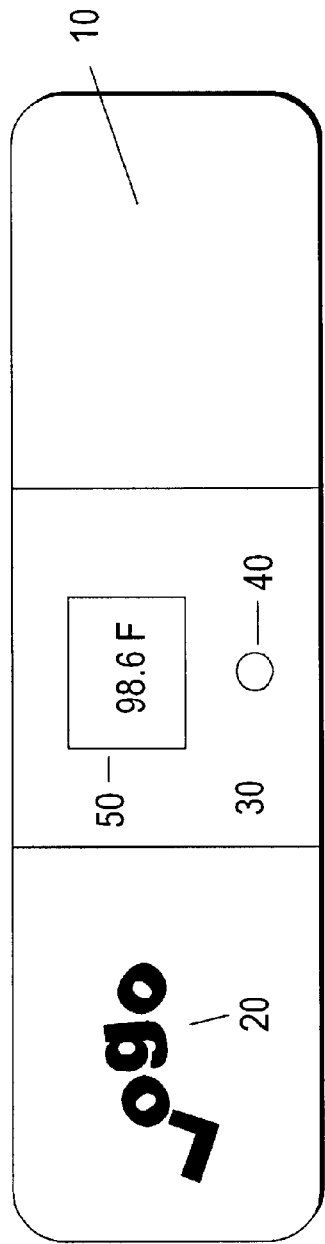
FIG. 2a illustrates the top side view of the top layer of the temperature monitoring station embodied as an adhesive patch.

FIG. 2a illustrates the topside view of the top layer of the TMS 10. The topside of the top layer of the TMS 10 may contain various elements. For example, it may contain a graphic 20. This graphic 20 may be the logo of the manufacturer, as illustrated, or it may be some other graphic. One popular alternative may be a graphic that is often associated with small infants, such as clowns or teddy bears. Another popular graphic may be a cartoon character.

The topside of the top layer may also contain an actuation button 40 in the micro-circuitry area 30. A user may press the actuation button 40 to turn the temperature monitoring system on or off. The actuation button 40 may also be many buttons, each button having a respective function. For example, one button may turn the entire system on and off, while another button may turn a local display 50 on or off.

The topside of the top layer may also contain a local display 50 in the micro-circuitry area 30. The display 50 may be a digital display for displaying the infant's current body temperature. The digital display may display the body temperature in Fahrenheit or Celsius or both. The type(s) of temperature scale displayed may be predetermined by the designer, or it may be selected by the user. The display 50 may also be a color display so that different colors may be used to represent a range of body temperatures. For example, when the infant's body temperature is 98–99 Fahrenheit, the display 50 may display a green background. If the infant's body temperature is 99–100 Fahrenheit, the display 50 may display a yellow background. If the infant's body temperature is over 100 degrees Fahrenheit, it may display a red background. The ranges associated with a specific color may be predetermined by the designer, or they may be set by the user. The display 50 may also be a combination of a color display and digital display. For example, if the infant's body temperature was 98.6 degrees Fahrenheit, a digital "98.6 F." could appear on a colored background (e.g. green background).

Figure 2B:
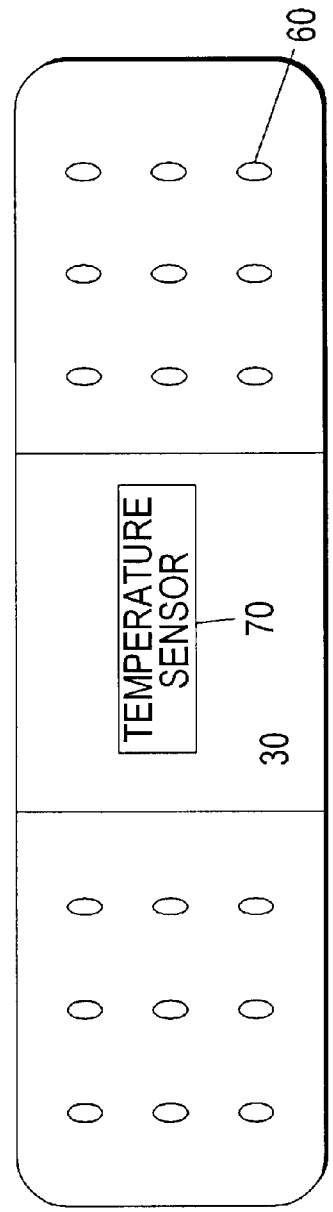
FIG. 2b illustrates the underside view of the bottom layer of the temperature monitoring station embodied as an adhesive patch.

FIG. 2b is an underside view of the bottom layer of the TMS 10. A portion of the underside layer of the TMS 10 may be adhesive so that when the TMS 10 is pressed upon a child's skin, the TMS 10 will stick to the skin and will not accidentally slip off. The adhesive material 60 may be spread liberally on the underside of the patch, or it may be placed on the underside of the patch in small, evenly spaced amounts as illustrated in FIG. 2b. The adhesive material 60 should be such that when removing the TMS 10 from the child's skin, the child's skin is not hurt.

The underside of the bottom layer of the TMS 10 may also contain a temperature sensor 70. The temperature sensor 70 may be a conventional electrical thermometer plate for measuring surface temperature, which is apparent to those skilled in the art. When the patch is placed on the infant's skin, the temperature sensor 70 may press against the infant's skin.

FIG. 2c illustrates a side view of the present invention embodied as an adhesive patch. As noted earlier, the TMS 10 is composed of a top layer 90 and a bottom layer 100. The two layers may be pressed together so as to form a single distinct unit. As also noted earlier, the TMS 10 has a micro-circuitry area 30 where the micro-circuitry resides between the top layer 90 and the bottom layer 100. The micro-circuitry area 30 may be rectangular in shape, as illustrated by guidelines 80 in FIG. 2c, or it may be in another shape.

Figure 3:
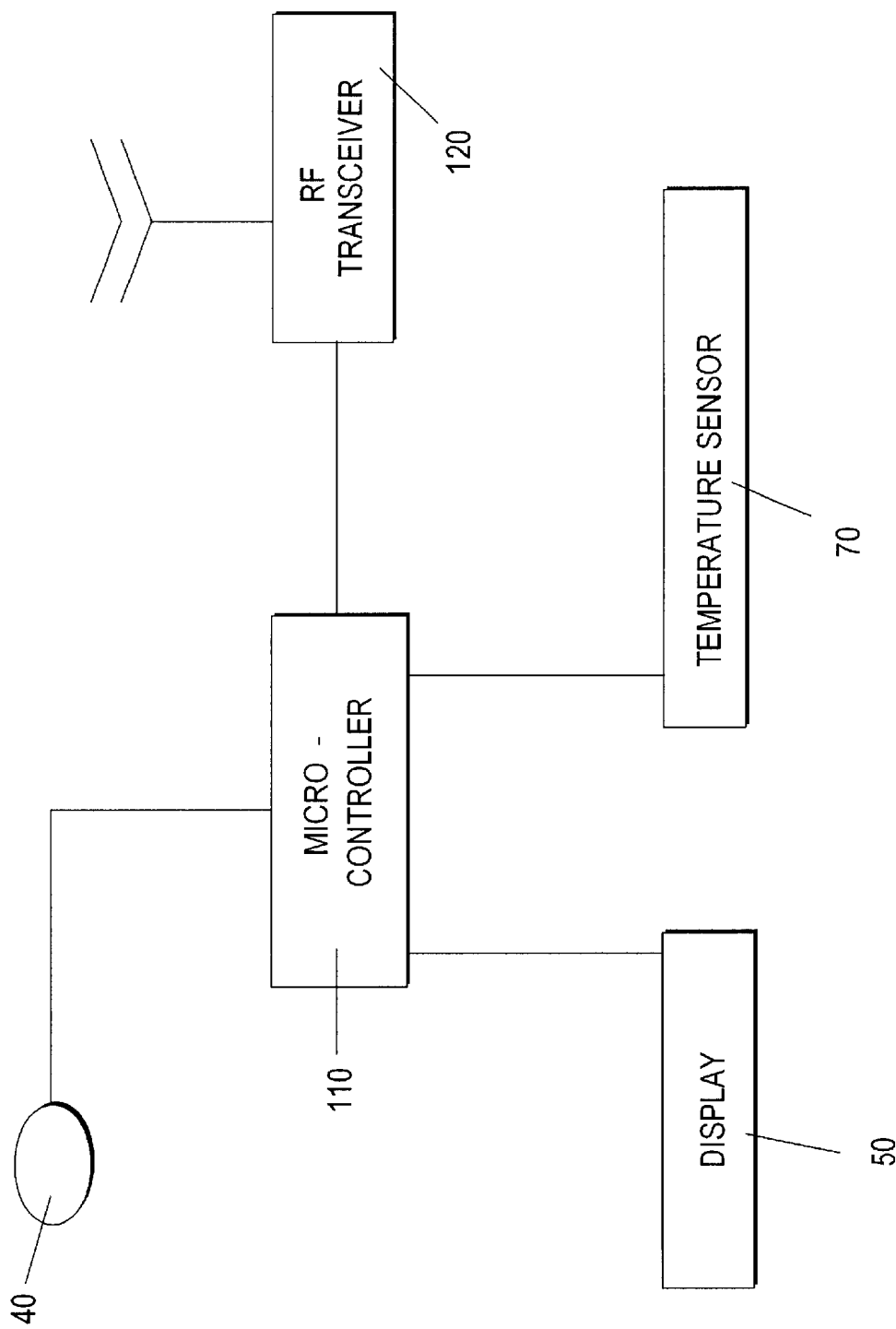
FIG. 3 illustrates a flow chart diagram of the micro-circuitry of the temperature monitoring station.

FIG. 3 illustrates the micro-circuitry of the TMS 10. As noted earlier, the micro-circuitry may reside in the micro-circuitry area 30 of the TMS 10 and it may include an actuation button 40, a display 50, and a temperature sensor 70. The micro-circuitry may also include a micro-controller 110 and an RF transceiver 120. The RF transceiver 120 may include an antenna. The micro-circuitry may also include a battery (not shown). A typical operation will now be described.

The TMS 10 may be placed in the appropriation location prior to system activation. For example, it may be attached to the child's skin prior to activation. Users desiring to activate the temperature monitoring system may do so in different ways. For example, a user may press the actuation button 40 on the TMS 10. This may generate an interrupt signal at the micro-controller 110. Users may also activate the monitoring system at the CS 5. The CS 5 will generate an interrupt signal that is transmitted to the TMS 10 through RF. The interrupt signal may be received at the RF Transceiver 120 and passed to the micro-controller 110.

While the system is not active, the micro-controller 110 may reside in a typical "Sleep" Mode so as to conserve battery power. Upon receiving an activation interrupt signal, the micro-controller may "Wake." If the interrupt was received at the actuation button 40, the micro-controller 110 may activate the RF Transceiver 120 and send a corresponding activation signal to the CS 5 indicating that the system is now active.

After the activation of the TMS 10 and the CS 5, the micro-controller 110 may poll a respective input line for a configuration signal if the system is configurable by the user. Since the actuation button 40 may be more than one button, a configuration signal may be generated by pressing one of the actuation buttons 40. A configuration signal may also be generated at the CS 5, transmitted to the RF transceiver 120 and passed to the micro-controller 110. If a configuration signal is detected, the micro-controller 110 may prompt the user for the desired configuration on the local display 50. A user may enter configuration information using the actuation button 40. Configuration information may be stored in the memory buffer of the micro-controller 110. The information may also be sent to the CS 5 and stored in the memory buffers of the micro-controller 550.

If a configuration signal is not received within a time-interval pre-determined by the designer, the micro-controller 110 times out and prevents the user from configuring the system. The micro-controller 110 may then send a signal to the temperature sensor 70 to monitor the infant's current body temperature.

The temperature sensor 70 may be capable of sensing the infant's body heat, and converting that signal to a body temperature. The body temperature information may then be sent to the micro-controller 110. Alternatively, the temperature sensor 70 may only be capable of sensing the infant's body heat. If so, the body heat information may be sent to the micro-controller 110 which may then convert the body heat information to body temperature information. The micro-controller 110 may store the body temperature information in its memory buffers. It may also display body information on a local display 50.

The micro-controller 110 may be configured so that so long as the system remains activated, the micro-controller 110 activates the temperature sensor 70 periodically. For example, it may active the temperature sensor 70 and obtain a new data reading every 6 seconds. The periodic time interval may be pre-determined by the designer, or it may be configured by the user. While a shorter time interval between readings provides more accurate information, a longer time period helps extend battery life.

The micro-controller 110 may also transmit information to the CS 5 through the RF Transmitter 120. The information sent to the CS 5 may be body heat information or it may be actual body temperature information. The micro-controller may also send a simple alarm signal to the CS 5 if appropriate. For example, the micro-controller 110 may compare the infant's current body temperature stored in its memory buffer to a predetermined number (e.g. average body temperature). If the infant's body temperature is above or below a certain tolerance level of that pre-determined number (e.g., 1 degree), the micro-controller 110 may send an alarm signal to the RF transceiver 120, which may transmit the signal to the CS 5.

The micro-controller may also send an alarm signal to the CS 5 only when a series of body temperature readings are not within a certain tolerance level of a pre-determined number. For example, the micro-controller 110 may determine that a body temperature reading is above or below a tolerance level for a pre-determined number. Rather than sending a signal immediately, the micro-controller 110 may wait for a second temperature reading. If a second temperature reading is above or below a certain tolerance level for a pre-determined number, the micro-controller 110 may send an alarm signal to the CS 5 through the RF Transceiver 120, or it may wait for a third temperature reading. The number of continuous temperature readings which must be above or below a certain tolerance level of a pre-determined number may be configured by the designer, or it may be configured by the user. By sending a signal only when a series of temperature readings indicates an anomalous body temperature, the user may reduce the occurrence of false alarms. For example, an infant's body temperature may rise below a certain tolerance level for one reading because of some physical exertion by the infant. As such, it may not be advantageous to transmit an alarm signal for every temperature reading that is anomalous. It may be noted, however, that the greater the number of temperature readings compared, the longer a valid alarm signal might be delayed.

The temperature sensor 70 may continue to monitor the infant's body temperature in pre-determined intervals until the micro-controller 110 sends a "Stop" signal. Such a "Stop" signal may occur when a second interrupt signal is received at the micro-controller 110. Such an interrupt signal may occur when the user presses the actuation button 40 for a second time, or when a second remote interrupt signal is received at the RF Transceiver 120 and passed to the micro-controller 110. After the micro-controller 110 has processed a "Stop" signal, it may return to "Sleep" mode to conserve power.

The TMS 10 may be physically embodied in various different forms other than an adhesive patch.

Figure 4A:
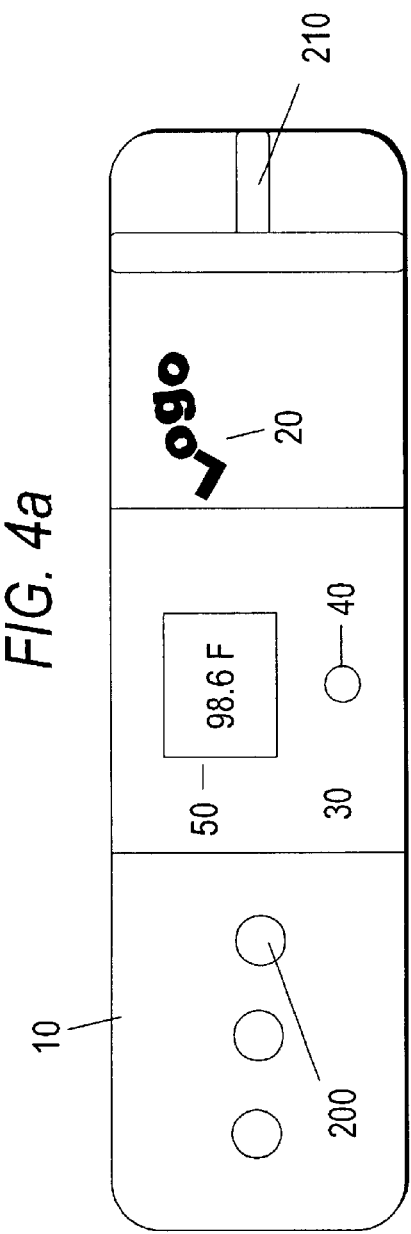
FIG. 4a illustrates a top view of a top layer of the temperature monitoring station embodied as a strap.
Figure 4B:
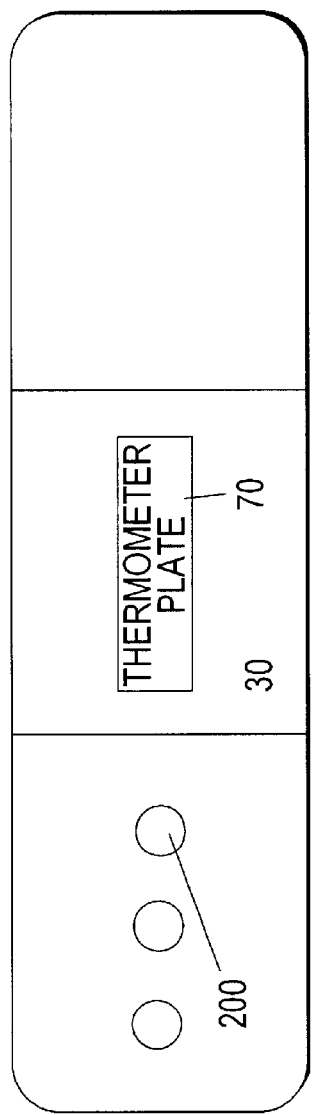

FIGS. 4a and 4b illustrate the TMS 10 embodied as a strap. The strap may have many of the same elements as in FIG. 2, such as a graphic 20, an actuation button 40, and a local display 50. The micro-circuitry may also reside in the micro-circuitry area 30. The underside of the strap may also have a temperature sensor 70.

Instead of attaching the patch to the infant with adhesive 60, the TMS 10 may be strapped on to the child using a buckle 210 and buckle holes 200. The strap may be locked around the child's arm, leg, or neck so that the temperature sensor 70 presses against the child's skin. The buckle 210 may be inserted into the buckle holes 200 to prevent the TMS 10 from slipping off. The buckle holes 200 may be pre-punched by the designer, or they may be punched by the user so that the strap is a custom-tailored fit for their infant.

The buckle 210 and the buckle holes 200 may also be replaced by Velcro hook and loop patches. Again, the strap may be locked around a certain part of the child so that the temperature sensor 70 presses against the skin. The Velcro hook patch may be pressed against the Velcro loop patch, thereby creating a snug fit.

Figure 5:
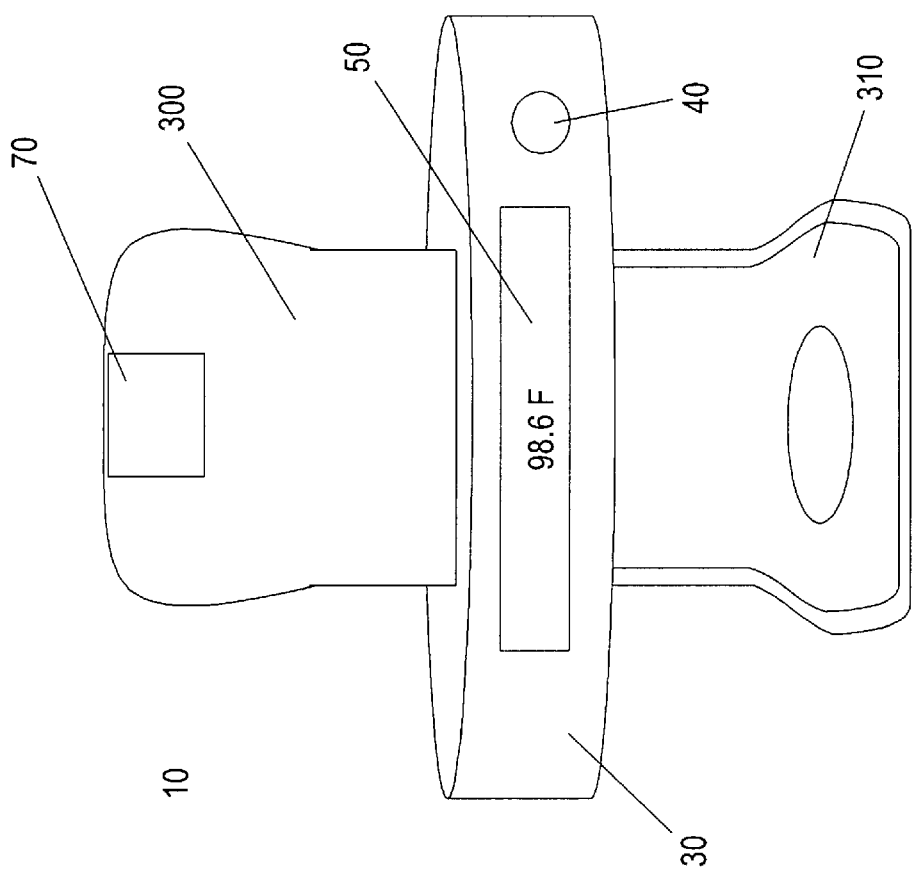
FIG. 5 illustrates a schematic representation of the temperature monitoring station embodied as a pacifier.

FIG. 5 illustrates the TMS 10 embodied as a pacifier. The pacifier may have an actuation button 40, a local display 50, and a micro-circuitry area 30 for the micro-circuitry to reside. The micro-circuitry area 30 may be in the plastic base of the pacifier. The TMS 10 may also have a handle 310 similar to the handles found on typical pacifiers.

The temperature sensor 70 may be placed on the rubber nipple 300 which is placed in the infant's mouth. When the system is activated, the temperature sensor 70 may determine the infant's body temperature. Also, the rubber nipple 300 may be constructed of the same type of material as the temperature sensor 70 so that the two may be interwoven so as to comprise a single unit.

Figure 6:
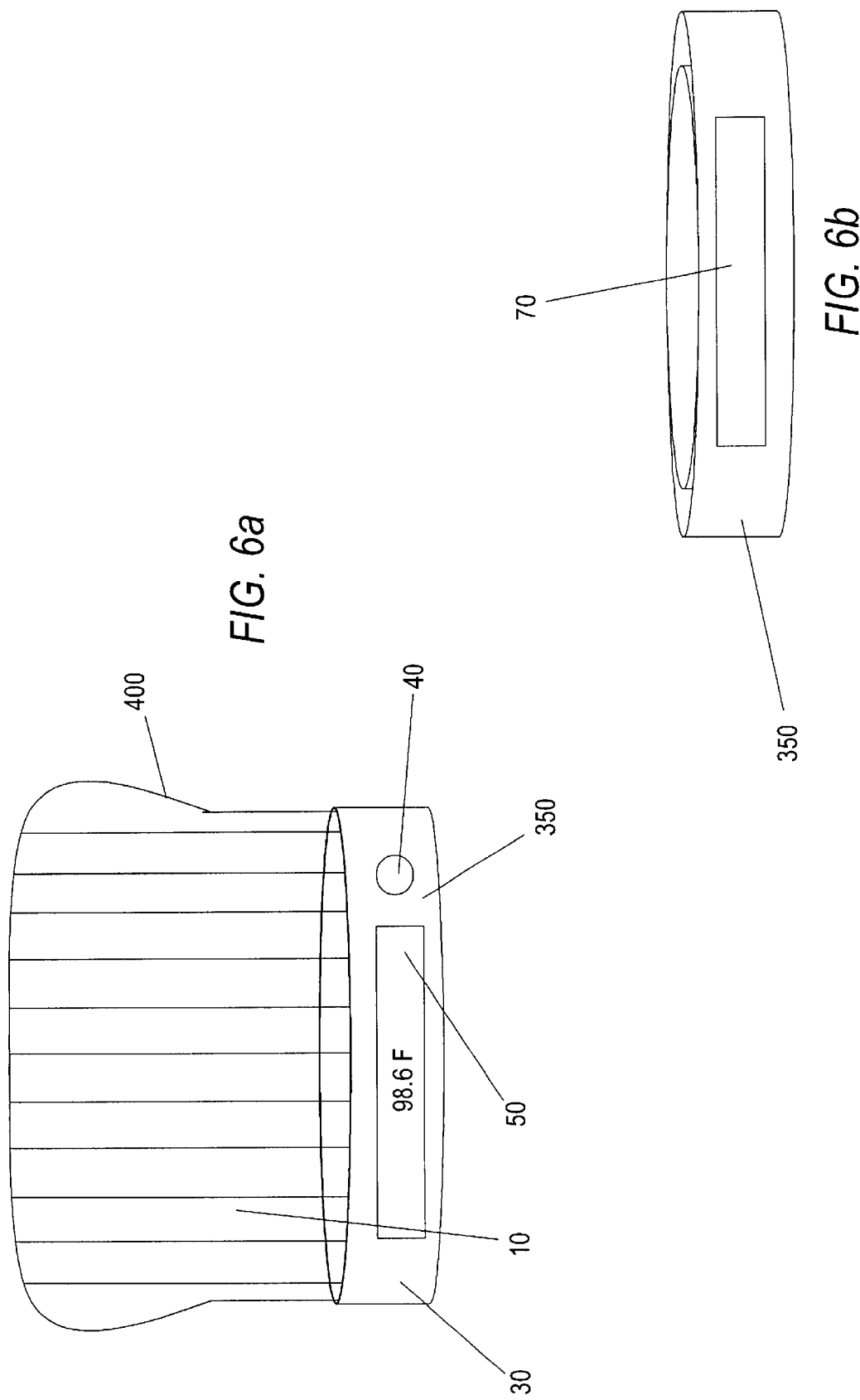
FIG. 6a illustrates a schematic representation of the temperature monitoring station embodied as a stocking cap as viewed from the outside of the cap.
FIG. 6b illustrates a schematic representation of the temperature monitoring station embodied as a stocking cap as viewed from the inside of the brim of the cap.

FIG. 6 schematically illustrates the TMS 10 as a stocking cap. FIG. 6a schematically illustrates the outer surface of the stocking cap. The stocking cap may be have a brim 350 and a stocking 400. The stocking cap may also have an actuation button 40, a local display 50, and a micro-circuitry area 30. The micro-circuitry may be sewn into the brim 350 of the hat in a specific area 30.

The stocking 400 for the stocking cap may be manufactured from many different materials. For example, if the parent desires to keep their infant cool, the stocking 400 may be manufactured from lightweight linen or terrycloth. If the parent desires to keep their infant warm, the stocking 400 may be manufactured from cotton or wool. Those skilled in the art will note that the stocking may also be manufactured from some combination of commonly known fabrics.

FIG. 6b illustrates the insides of the stocking cap's brim 350. The insides of the brim 350 may have a temperature sensor 70 sewn into the micro-circuitry area 30. When the stocking cap is placed on the infant's head, the brim 350 may fit snugly around the infant's head so that the temperature sensor 70 is pressed against the infant's skin (e.g. the infant's forehead).

Figure 7:
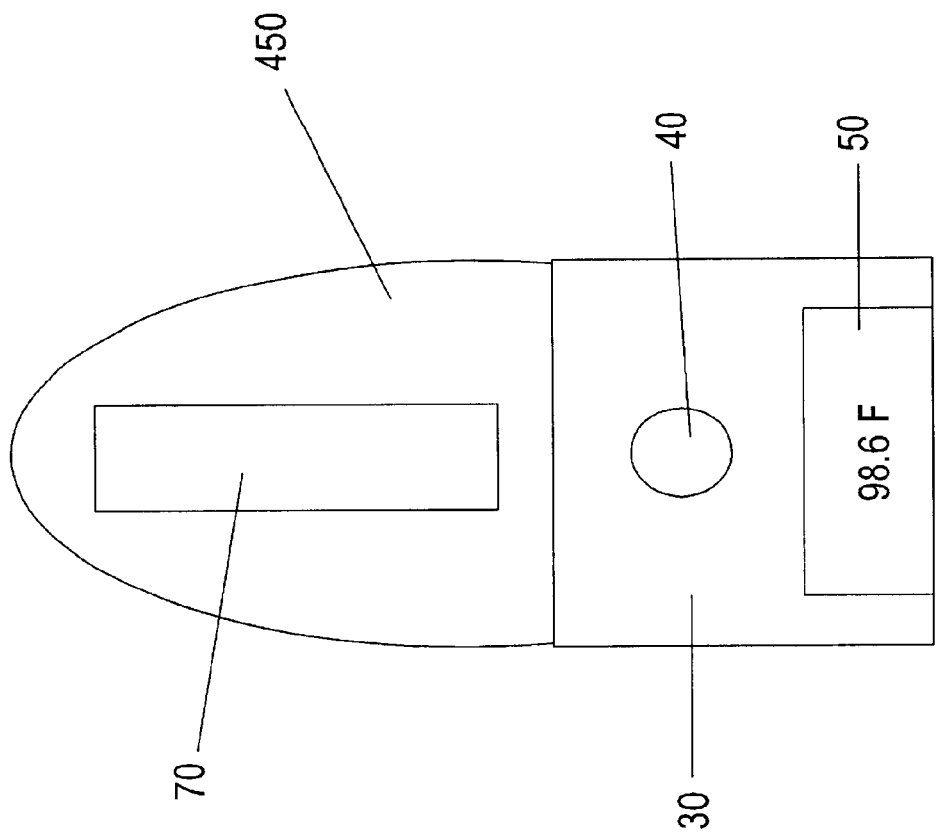
FIG. 7 illustrates a schematic representation of the temperature monitoring station embodied as a finger clasp.

FIG. 7 illustrates the TMS 10 as a finger clasp 450. The finger clasp 450 may be manufactured from rubber, plastic, or some other appropriate material. The finger clasp 450 may include an actuation button 40, a local display 50, and a micro-circuitry area 30 located at the base of the clasp. The inner surface of the finger clasp 450 may have a temperature sensor 70. When the finger clasp is slipped over an infant's finger, the temperature sensor 70 may press against the infant's skin so that the infant' body temperature may be monitored.

Figure 8:
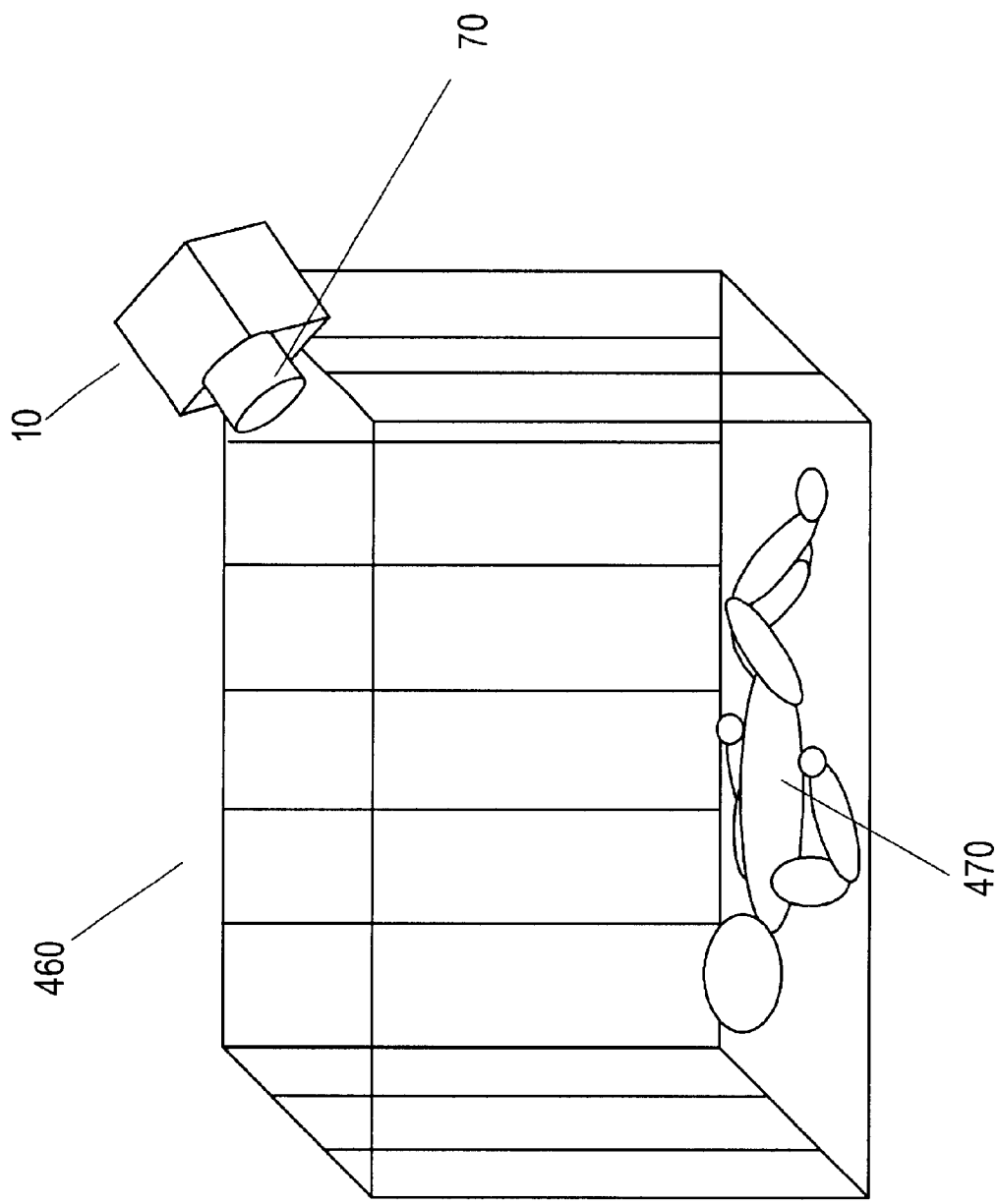
FIG. 8 illustrates a schematic representation of the temperature monitoring station embodied as an infrared heat detector.

FIG. 8 illustrates the TMS 10 as an infrared heat detector. The TMS 10 may be placed on a crib 460 so that the TMS 10 is pointed at the infant's body 470. As in the other embodiments, the TMS 10 may include an actuation button, a local display, micro-circuitry, and a micro-circuitry area (not shown). The temperature sensor 70 may be an infrared detector, which when pointed at the infant's body, may detect the infant's body heat. The body heat information may be passed to the micro-controller 110, which may convert the body heat readings into body temperatures.

Figure 9:
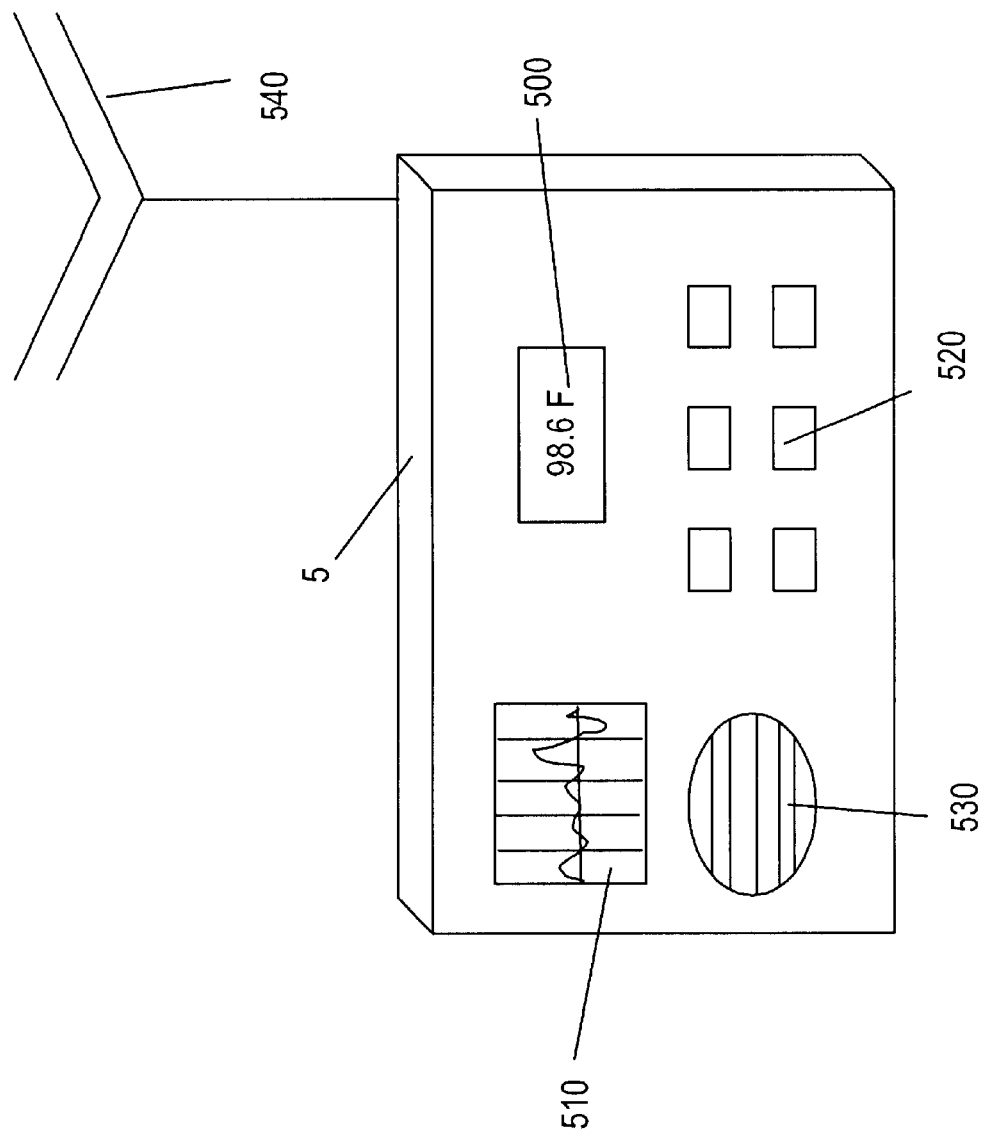
FIG. 9 illustrates the companion station embodied as a console.

FIG. 9 illustrates the system's companion station (CS) 5 as a console. The CS 5 may contain a local display 500, although it does not have to. The display 500 may be a digital display for displaying the infant's current body temperature. The digital display may display the body temperature in Fahrenheit or Celsius or both. The type(s) of temperature scale displayed may be predetermined by the designer, or it may be selected by the user. The display 500 may also be a color display so that different colors may be used to represent a range of body temperatures. For example, when the infant's body temperature is 98–99 Fahrenheit, the display 500 may display a green background. If the infant's body temperature is 99–100 Fahrenheit, the display 500 may display a yellow background. If the infant's body temperature is over 100 degrees Fahrenheit, it may display a red background. The ranges associated with a specific color may be predetermined by the designer, or they may be set by the user. The display 500 may also be a combination of a color display and digital display. For example, if the infant's body temperature was 98.6 degrees Fahrenheit, a digital "98.6 F." could appear on a colored background (e.g. green background).

The CS 5 may also include a graph display 510. The graph display 510 may display the infant's average body temperature over a specific time interval. The time interval may be predetermined by the designer, or it may be configured by the user. The graph display 510 may display information as an analog graph or it may display information as a digital graph.

The CS 5 may also include a keypad 520 for inputting information. The keypad 520 may be a single key, or it may be more than one key. The local display 520 may display information 520 based on input entered at the keypad 520.

The CS 5 may also include a speaker 530 for making alarm signals audible. The CS 5 may also include an antenna 540 connected to its RF Transceiver (not shown). The CS 5 may also include a micro-controller (not shown).

Figure 10:
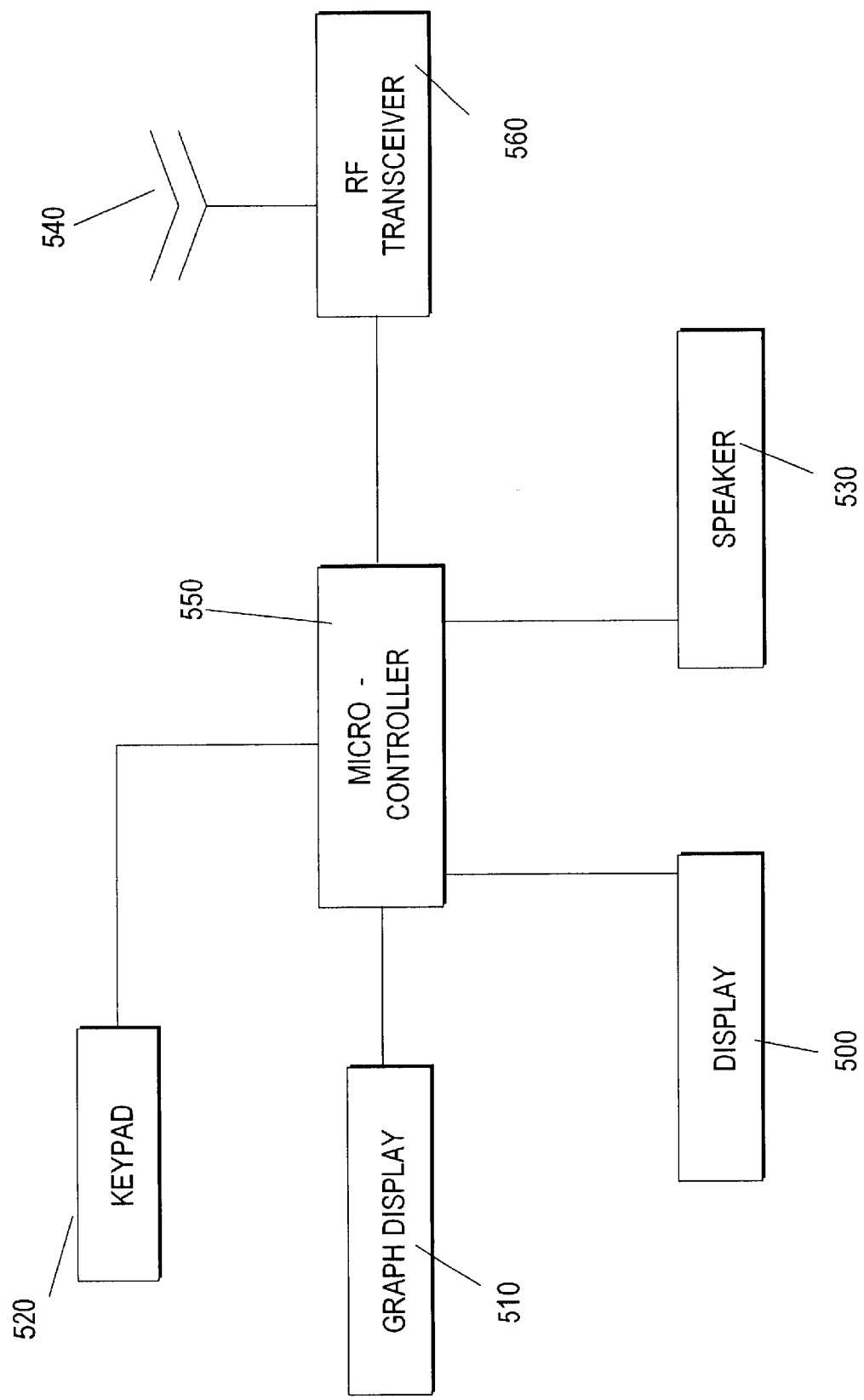
FIG. 10 illustrates a flow diagram of the micro-circuitry of a companion station.

FIG. 10 illustrates the micro-circuitry of the CS 5. As noted, the micro-circuitry of the CS 5 may include a local display 500, a graph display 510, a keypad 520, and a speaker 530. The micro-circuitry may further include a micro-controller 550 and an RF Transceiver 560 connected to an antenna. The micro-circuitry may also include a battery (not shown), or it may be powered by some other power source (e.g. AC wall outlet). A typical operation will now be described.

The TMS 10 may be placed in the appropriate location prior to system activation. For example, it may be attached to the child's skin prior to activation. Users desiring to activate the temperature monitoring system may do so in different ways. For example, a user may press the keypad 520 on the CS 5. This may generate an interrupt signal at the micro-controller 550. Users may also activate the monitoring system at the TMS 10 (see above). The TMS 10 will generate an interrupt signal that is transmitted to the CS 5 through RF. The interrupt signal may be received at the RF Transceiver 560 and passed to the micro-controller 550.

While the system is not active, the micro-controller 550 may reside in a typical "Sleep" Mode so as to conserve battery power. Upon receiving an activation interrupt signal, the micro-controller may "Wake." If the interrupt was received at the keypad 520, the micro-controller 550 may activate the RF Transceiver 560 and send a corresponding activation signal to the TMS 10 indicating that the system is now active.

After the activation of the TMS 10 and the CS 5, the micro-controller 550 may poll a respective input line for a configuration signal if the system is configurable by the user. Since the keypad 520 may be more than one key, a configuration signal may be generated by pressing on the keypad 520. A configuration signal may also be generated at the TMS 10, transmitted to the RF transceiver 560 and passed to the micro-controller 550. If a configuration signal is detected, the micro-controller 550 may prompt the user for the desired configuration on the local display 500. Users may enter configuration information using the keypad 520. The configuration information may be stored in the memory buffer of the micro-controller 550. It may also be transmitted to the TMS 10 and stored in the memory buffers of micro-controller 110.

If a configuration signal is not received within a time-interval pre-determined by the designer, the micro-controller 550 times out and prevents the user from configuring the system.

Information may be received by the CS 5 at the RF Transceiver 560. For example, the CS 5 may receive body temperature information at the RF Transceiver 560. This body temperature information may be passed to the micro-controller 550. The micro-controller 550 may store the information in its memory buffer. It may display the information on the local display 500. It may use a series of body temperature readings to create a graph for display on the graph display 510. If the body temperature reading is above or below a certain tolerance level of pre-determined number (e.g. average body temperature), it may generate a signal at the speaker 530 causing an alarm to sound.

The CS 5 may also receive body heat information at the RF Transceiver 560. The information may be passed to the micro-controller 550 which may convert the body heat information to body temperature data. The micro-controller 550 may store the body temperature information in its memory buffer. It may display the body temperature information on the local display 500. It may use a series of body temperature readings to create a graph for display on the graph display 510. If the body temperature reading is above or below a certain tolerance level of pre-determined number (e.g. average body temperature), it may generate a signal at the speaker 530 causing an alarm to sound.

The CS 5 may also receive a simple alarm signal at the RF Transceiver 560. If such a signal is received, the micro-controller 110 at the TMS 10 has already determined that the body temperature reading or series of body temperature readings is above or below a certain tolerance level of a pre-determined number. Such an alarm signal would be passed to the micro-controller 550. The micro-controller may generate a signal at the speaker 530 so that an alarm may sound.

The CS 5 may be physically embodied in many different forms.

Figure 11:
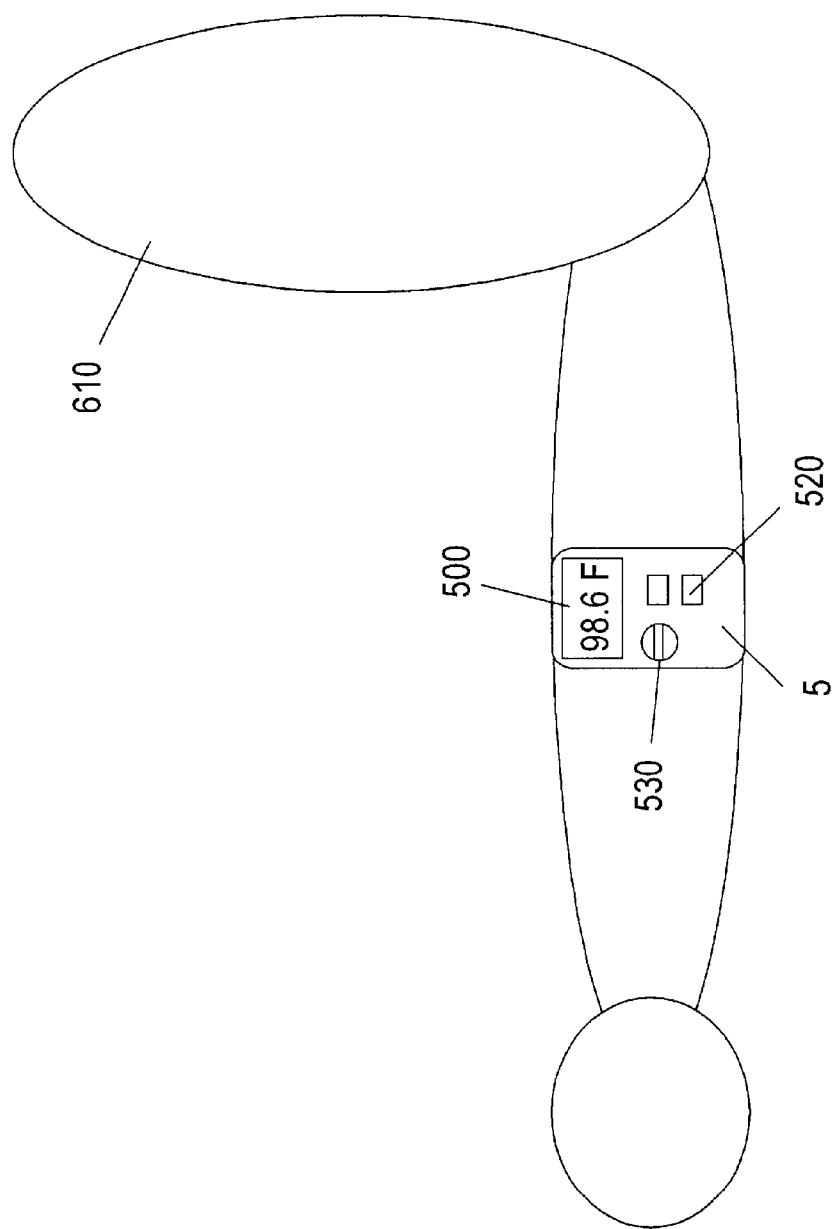
FIG. 11 illustrates the companion station embodied as a wearable wrist device.

FIG. 11 illustrates the CS 5 embodied as a wearable wrist device. The CS 5 may be strapped to the wrist of a user's arm 610. The CS 5 may include a local display 500, a keypad 520, and a speaker 530. It may also include a micro-controller 550 and an RF Transceiver 560 (not shown). The microprocessor 550 may be configured so that when the system is not activated, the local display 500 functions as a chronometer.

Figure 12:
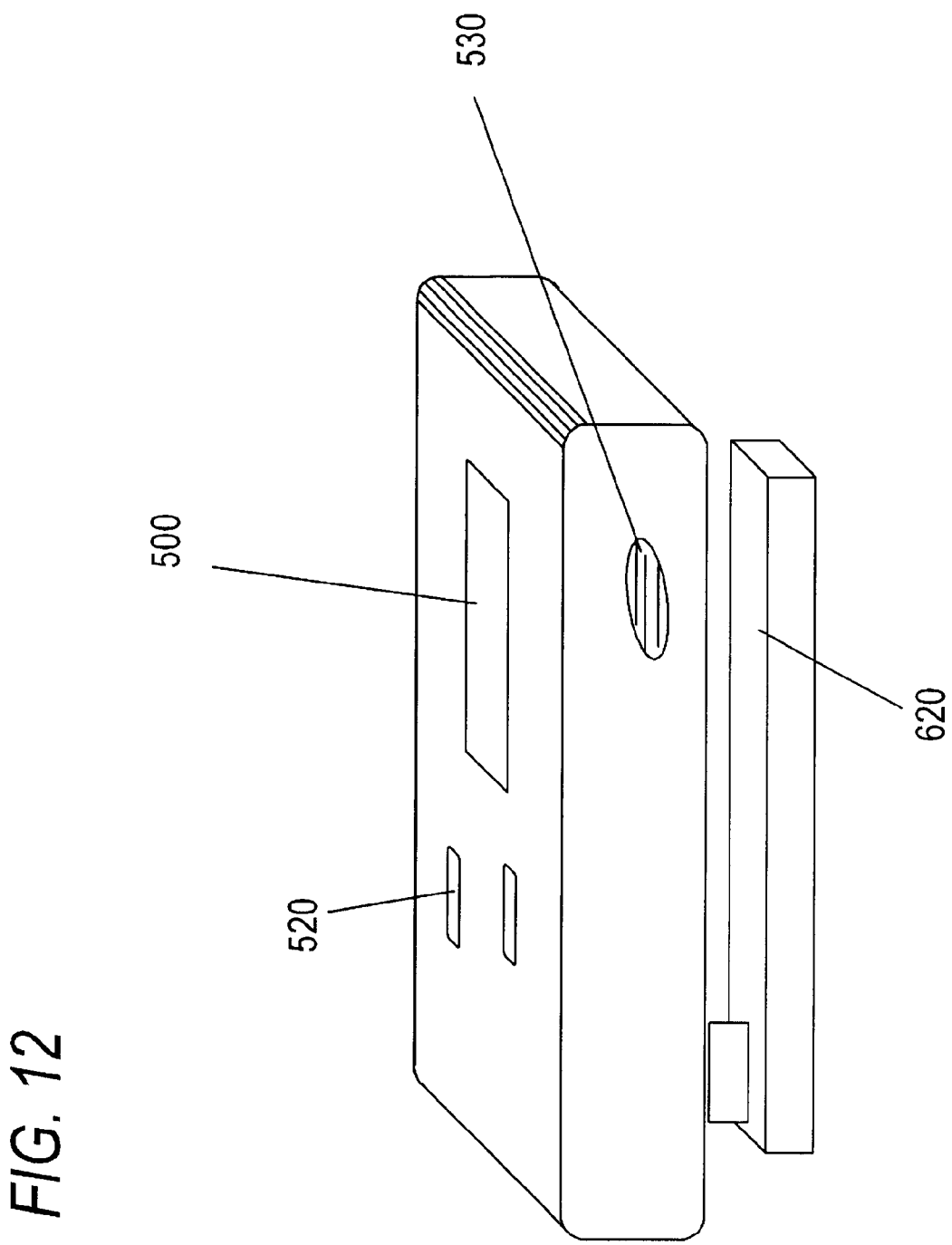
FIG. 12 illustrates a schematic representation of the companion station embodied as a miniature console in the form of a pager or beeper.

FIG. 12 illustrates the CS 5 embodied as a miniature console in the form of a pager or beeper. The CS 5 may be attached to the user's clothing by a clip 620. The CS 5 may include a local display 500, a keypad 520, and a speaker 530. It may also include a micro-controller 550 and an RF Transceiver 560 (not shown). The microprocessor 550 may be configured so that when the system is not activated, the local display 500 functions as a chronometer. The CS 5 may be further configured to work as a regular pager when the system is not activated.

Figure 13:
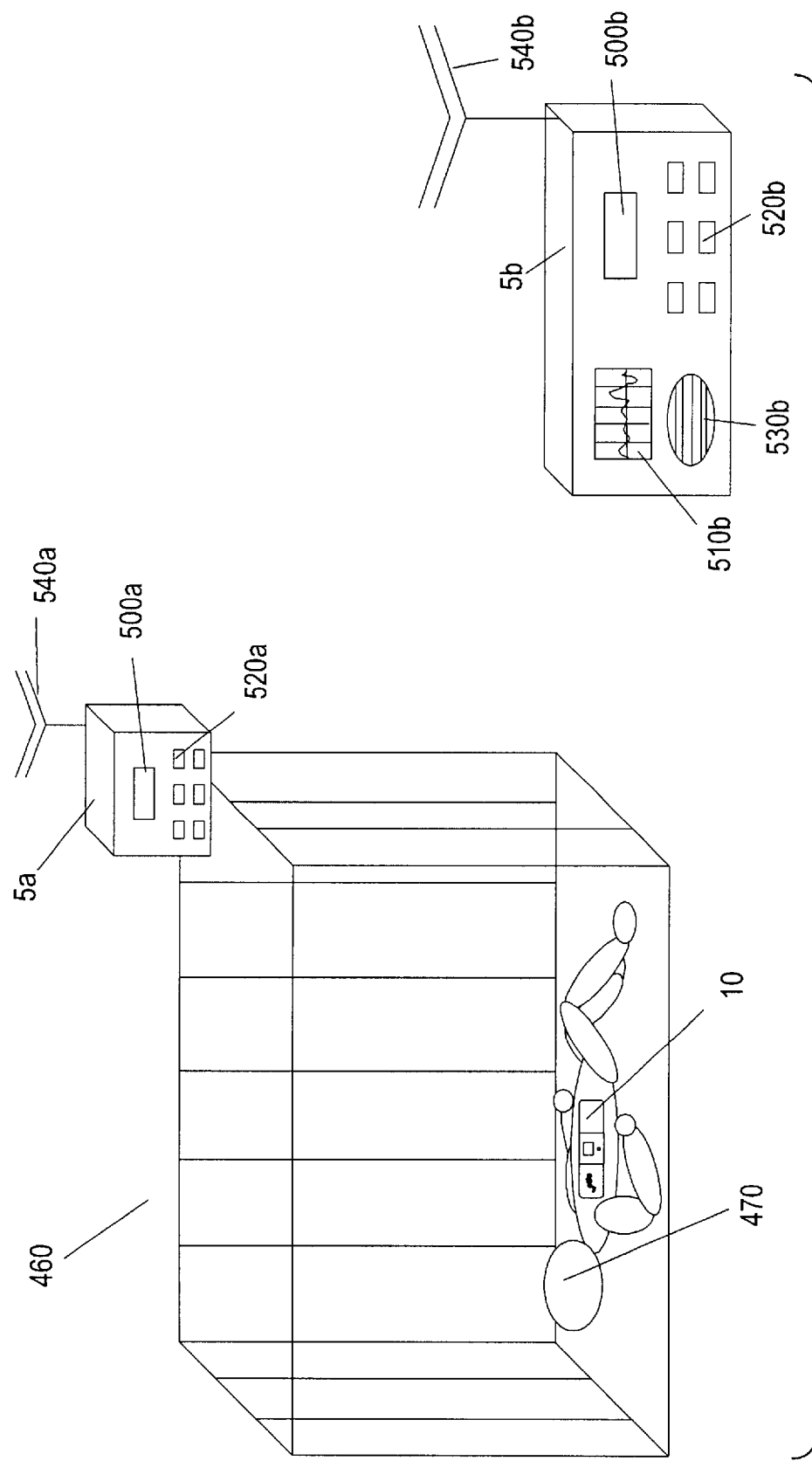
FIG. 13 illustrates an embodiment of the present invention wherein multiple companion stations are used.

FIG. 13 illustrates a system where multiple CS 5 are utilized. Because of recent studies indicating the possible dangers of cellular phone use, parents may be hesitant to place a device with an RF Transceiver on their infant child. It would be advantageous, then, to have a system where the RF Transceiver 120 in the TMS 10 is relatively low-powered.

Such a system may be realized by using two (or more) CS 5. CS 5*a* may be placed on or near a crib 460. The TMS 10 may be placed on or near the infant 470. When it is appropriate for the RF Transceiver 120 on the TMS 10 to transmit information, the TMS 10 may communicate with the CS 5*a* using a very low power signal. The signal may also be low in frequency. The signal may be received by the CS 5*a* and re-broadcast to CS 5*b*. The re-broadcast signal may be stronger in strength and power. As such, a system where a CS 5*b* is relatively far-away from the infant 470 may be realized without having the RF Transceiver 120 on the TMS 10 transmit a strong signal.

Furthermore, if the CS 5*b* needs to transmit information to the TMS 10, it may do so through the CS 5*a*. The CS 5*b* may send a strong signal to the CS 5*a*. The CS 5*a* may reduce the signal in intensity and relay it to the TMS 10 so that the TMS 10 receives a relatively weak RF transmission.

Those skilled in the art will notice that if CS 5*a* is being used solely as a relaying station, it may simply include an RF transceiver and appropriate circuitry. However, it may also include other components such as a display 500*a*, a keypad 520*a*, etc. Similarly, CS 5*b* may include other components, such as display 500*b*, a keypad 520*b*, etc.

Figure 14:
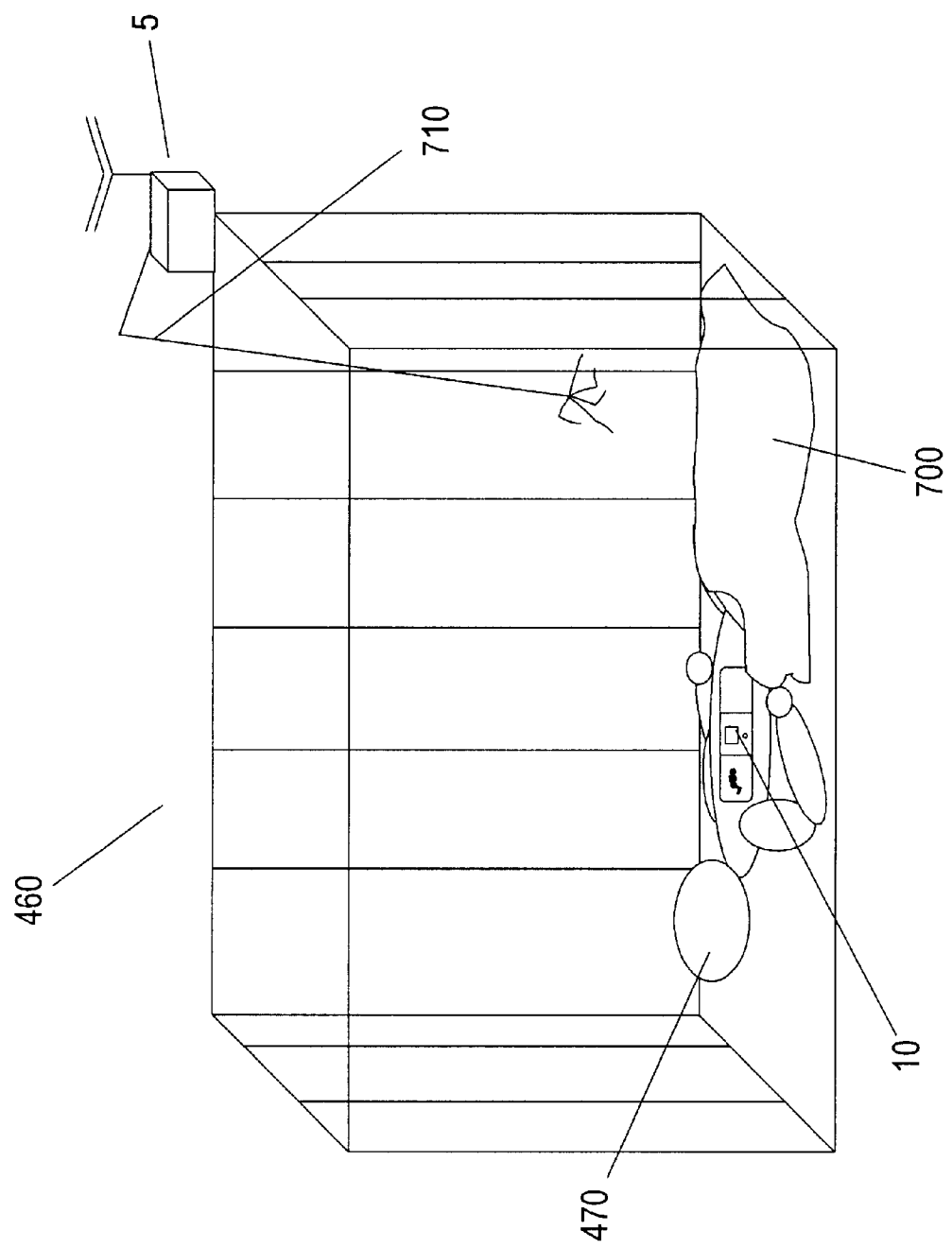
FIG. 14 illustrates a schematic representation of an embodiment of the present invention wherein a companion station includes a mechanical arm.

FIG. 14 illustrates a system where a CS 5 has an attached mechanical arm 710. The system may work as previously described. However, the CS 5 may be configured so that when a body temperature reading indicates a body temperature above or below a certain tolerance level of a predetermined number, the mechanical arm 710 either removes a blanket 700 from the infant's body or place's a blanket 700 on the infant's body. Although FIG. 14 only illustrates a single CS 5, those skilled in the art will note that multiple CS 5 may be used as in FIG. 13.

Figure 15:
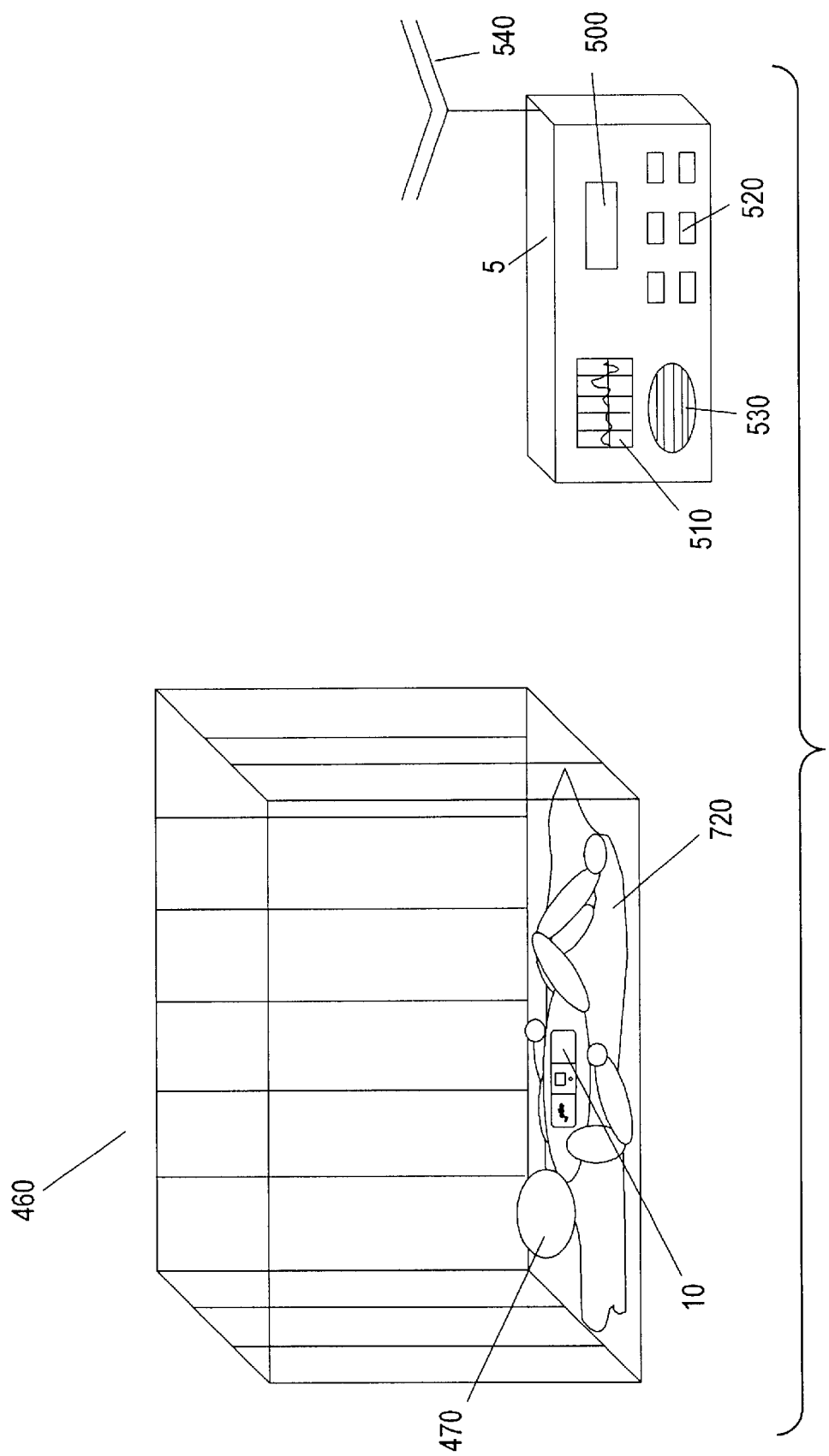
FIG. 15 illustrates a schematic representation of an embodiment of the present invention wherein a heat blanket is incorporated into the system.

FIG. 15 illustrates a system wherein a heating pad 720 has been added. The heating pad 720 has a built-in RF Transceiver (not shown). When a body temperature reading indicates that the infant's body temperature is below a certain tolerance level of a predetermined number, either the TMS 10 or the CS 5 may transmit a signal the heating pad 720. Such a signal would instruct the heating pad's heating element to activate so that the child would be provided warmth and comfort.

The following claims are intended to cover all of the generic and specific features of the invention described herein, and all statements of the scope of the invention which, as a matter of language, might be said to fall there between.

I claim:

1. A monitor of a body parameter of an infant, comprising:
at least one monitoring station having at least one sensor arranged to sense a body parameter of an infant, a controller responsive to the sensing of the body parameter of the infant by the at least one sensor to generate a signal that is either indicative of the sensed body parameter or indicative of a result from a comparison of the sensed body parameter with at least one value, and a transceiver arranged to transmit the signal in response to direction from the controller;
at least one companion station having a further transceiver and having an output device and being spaced from the at least one monitoring station, the further transceiver being responsive to receipt of the signal to transmit the signal to the output device;
a heating element;
an additional transceiver; and
a further controller being responsive to receipt of the signal by the additional transceiver to interpret same to determine whether direction should be given to the heating element to actuation and, it so, providing the direction to actuate the heating element.

2. A monitor of a change in a body parameter of an infant, comprising:
at least one monitoring station having at least one sensor arranged to sense a change in a body parameter of an infant, a controller responsive to the sensing of the change in the body parameter of the infant by the at least one sensor to generate a signal that is either indicative of the sensed change in the body parameter or indicative of a result from a comparison of the sensed change in the body parameter with at least one value, and a transceiver arranged to transmit the signal in response to direction from the controller;
at least one companion station having a further transceiver and having an output device and being spaced from the at least one monitoring station, the further transceiver being responsive to receipt of the signal to transmit the signal to the output device;
a heating element;
an additional transceiver; and
a further controller being responsive to receipt of the signal by the additional transceiver to interpret same to determine whether direction should be given to the heating element to actuation and, if so, providing the direction to actuate the heating element.

3. A monitor as in claim 1 or 2, wherein the at least one monitoring station includes two layers of housing pressed together and configured to be strapped to the infant.

4. A monitor as in claim 1 or 2, wherein the at least on monitoring station includes a mold configured to fit onto an infant's fingers.

5. A monitor as in claim 1 or 2, wherein the output device includes a speaker.

6. A monitor as in claim 1 or 2, further comprising a heating pad having the additional transceiver, the further controller, and the healing element.

7. A monitor as in claim 1 or 2, further comprising a heating blanket having the additional transceiver, the further controller, and the heating element.

8. A monitor as in claim 1 or 2, wherein the first monitoring station includes a two-layered adhesive patch with the sensor secured to the adhesive patch.

9. A monitor as in claim 1 or 2, wherein the first monitoring station includes a pacifier with the sensor secured to the pacifier.

10. A monitor as in claim 1 or 2, wherein the first monitoring station includes a stocking cap with the sensor secured to the stocking cap.

11. A monitor as in claim 1 or 2, wherein the first monitoring station includes a finger clasp with the sensor secured to the finger clasp.

12. A monitor as in claim 1 or 2, wherein the first monitoring station is an infrared heat detector, the sensor sensing based on infrared heat detection.

13. A monitor as in claim 1 or 2, wherein the companion station includes a wearable wrist device with the sensor secured to the wearable wrist device.

14. A monitor as in claim 1 or 2, wherein the companion station includes a mechanical arm.

15. A monitor as in claim 1 or 2, wherein the parameter is one of body temperature and body heat and any combination thereof.

16. A monitor as in claim 1 or 2, wherein the value is stored in memory by the controller.

17. A monitor as in claim 1 or 2, wherein the signal is indicative of the result, the result reflecting that the comparison found that the sensed body parameter was outside a tolerable range.

18. A monitor as in claim 17, wherein the output device to generate an alarm indication as result of interpretation of the signal received by the further transceiver being that a result of the comparison finding that the sensed body parameter was outside a tolerable range.

19. A monitor as in claim 17, wherein the controller makes an analysis of a series of sensed body parameter readings over time to determine whether the sensor sensed an anomalous body temperature and, if so, prevents the transmission of a signal that would otherwise indicate that the sensed body parameter was outside the tolerable range.

20. A monitor as in claim 1 or 2, wherein the companion station is configured as a console device in a form of a pager or beeper.

21. A method of monitoring a body parameter of an infant, comprising:

sensing a body parameter of an infant;

generating a signal in response to the sensing that is either indicative of the sensed body parameter or indicative of a result from a comparison between the sensed body parameter and at least one value;

transmitting the signal via a transceiver;

receiving via a further transceiver the signal remote from the sensing, generating and transmitting;

responding to receipt of the signal by either making an indication or transmitting a further signal;

transmitting the further signal;

receiving the further signal; and actuating a heating element in response to receipt of the further signal.

22. A method as of monitoring a change in a body parameter of an infant, comprising:

sensing a change in a body parameter of an infant;

generating a signal in response to the sensing that is either indicative of the sensed change in the body parameter of the infant or indicative of a result from a comparison between the sensed change in the body parameter of the infant and at least one value;

transmitting the signal via a transceiver;

receiving via a further transceiver the signal remote from the sensing, generating and transmitting;

responding to receipt of the signal by either making an indication or transmitting a further signal;

transmitting the further signal;

receiving the further signal; and actuating a heating element in response to receipt of the further signal.

23. A method as in claim 21 or 22, wherein the sensing arises from infrared heat detection.

24. A method as in claim 21 or 22, wherein the sensing arises from contact with the skin of the infant.

* * * * *